(12) United States Patent
Sennyu et al.

(10) Patent No.: US 8,957,348 B2
(45) Date of Patent: Feb. 17, 2015

(54) WELDING EQUIPMENT

(75) Inventors: Katsuya Sennyu, Tokyo (JP); Shuho Tsubota, Tokyo (JP); Fumiaki Inoue, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 216 days.

(21) Appl. No.: 13/639,156

(22) PCT Filed: May 10, 2011

(86) PCT No.: PCT/JP2011/060743
§ 371 (c)(1),
(2), (4) Date: Oct. 3, 2012

(87) PCT Pub. No.: WO2011/142350
PCT Pub. Date: Nov. 17, 2011

(65) Prior Publication Data
US 2013/0026142 A1    Jan. 31, 2013

(30) Foreign Application Priority Data

May 14, 2010   (JP) ................................. 2010-111952

(51) Int. Cl.
*B23K 26/20*  (2014.01)
*B23K 26/28*  (2014.01)
(Continued)

(52) U.S. Cl.
CPC ............... *B23K 26/285* (2013.01); *B23K 26/28* (2013.01); *B23K 26/20* (2013.01);
(Continued)

(58) Field of Classification Search
CPC ........ B23K 26/12; B23K 26/20; B23K 26/28; B23K 31/00; B23K 31/02

USPC ............ 219/121.63–121.72, 121.78, 121.79, 219/121.86
See application file for complete search history.

(56) References Cited

U.S. PATENT DOCUMENTS 4,414,460 A *  11/1983  Sudo et al. ............... 219/121.64
4,760,236 A *   7/1988  Stoll ......................... 219/121.63
(Continued)

FOREIGN PATENT DOCUMENTS

JP    61-183921    8/1986
JP    63-140786    6/1988
(Continued)

OTHER PUBLICATIONS

International Search Report issued Jun. 7, 2011 in corresponding International Application No. PCT/JP2011/060743.
(Continued)

*Primary Examiner* — Samuel M Heinrich
(74) *Attorney, Agent, or Firm* — Wenderoth, Lind & Ponack, LLP.

(57) ABSTRACT

A welding equipment that forms an end part includes a vacuum chamber; a holding member that is installed in the vacuum chamber and that holds the end part in which a welding groove is formed by placing a half cell, an end plate, and a beam pipe next to each other; a window that is installed in a top-end surface portion of the vacuum chamber, which intersects with an axial center of the end part, and that forms a portion thereof; a laser radiating head that is installed outside the vacuum chamber and that radiates a laser beam into an internal space of the end part through the window; and a mirror member that is installed in the internal space of the end part and that adjusts a reflected laser beam, formed by reflecting the laser beam, so as to be oriented perpendicular to the welding groove.

5 Claims, 3 Drawing Sheets

(51) Int. Cl.
*B23K 26/08* (2014.01)
*B23K 26/10* (2006.01)
*B23K 26/12* (2014.01)
*B23K 26/32* (2014.01)
*B23K 26/30* (2014.01)
*B23K 37/04* (2006.01)

(52) U.S. Cl.
CPC .......... *B23K 26/0823* (2013.01); *B23K 26/106* (2013.01); *B23K 26/122* (2013.01); *B23K 26/123* (2013.01); *B23K 26/322* (2013.01); *B23K 26/423* (2013.01); *B23K 37/0443* (2013.01); *B23K 2201/04* (2013.01); *B23K 2203/08* (2013.01)
USPC ............. 219/121.63; 219/121.78; 219/121.86

(56) References Cited

U.S. PATENT DOCUMENTS

| | | | | |
|---|---|---|---|---|
| 5,347,242 | A | * | 9/1994 | Shimano et al. ............. 333/99 S |
| 6,097,153 | A | * | 8/2000 | Brawley et al. ............. 315/5.41 |
| 2010/0044922 | A1 | | 2/2010 | Higashi et al. |

FOREIGN PATENT DOCUMENTS

| | | |
|---|---|---|
| JP | 7-112296 | 5/1995 |
| JP | 10-272587 | 10/1998 |
| JP | 2000-260599 | 9/2000 |
| JP | 2007-50415 | 3/2007 |
| JP | 3959198 | 8/2007 |
| JP | 2007-283354 | 11/2007 |
| JP | 2010-46694 | 3/2010 |
| JP | 2011-40321 | 2/2011 |

OTHER PUBLICATIONS

Written Opinion of the International Search Authority issued Jun. 7, 2011 in corresponding International Application No. PCT/JP2011/060743.

Notice of Reason(s) for Refusal issued Feb. 18, 2014 in corresponding Japanese Application No. 2010-111952 (with partial English translation).

Notice of Reason(s) for Refusal issued Sep. 30, 2014 in corresponding Japanese Application No. 2010-111952 (with English translation).

* cited by examiner

WELDING EQUIPMENT

TECHNICAL FIELD

The present invention relates to a welding equipment employed, in particular, for manufacturing a superconducting accelerator cavity.

BACKGROUND ART

A superconducting accelerator cavity is formed by joining a plurality of members that are placed one after another in an axial direction. This joining is conventionally performed from outside by penetration welding by electron beam welding or laser welding in a vacuum atmosphere because a vacuum atmosphere has low contamination caused by impurities.

In the case in which penetration welding from outside is employed in this way, because unexpected irregularities are sometimes formed in terms of the welded states inside the superconducting accelerator cavity, post-processing therefor is time consuming. In addition, because a driving system that drives the superconducting accelerator cavity, an electron gun, and so forth are placed in the vacuum atmosphere, the volume of vacuum container is increased, which increases the size of the equipment and makes it expensive. Because it takes time to establish the vacuum atmosphere due to the large vacuum container volume, the operation time is increased, which increases the operating costs.

Therefore, there is a demand for reducing internal post-processing by performing welding from inside a superconducting accelerator cavity.

As a technique for doing so, it has been proposed, for example, to perform joining in a superconducting accelerator cavity from the inside by employing laser welding in an argon atmosphere, as disclosed in Patent Literature 1.

However, sufficient performance may not be achieved with the technique in which the laser welding is performed in an argon atmosphere.

CITATION LIST

Patent Literature

{PTL 1} Publication of Japanese Patent No. 3959198

SUMMARY OF INVENTION

Technical Problem

Because a superconducting accelerator cavity is a hollow, annular body, in the case of laser welding, it is conceivable to make a laser beam incident from outside a vacuum container to perform welding inside the superconducting accelerator cavity.

In this case, because the laser beam is incident at an angle with respect to a position perpendicular to a welding groove, there is a risk of missing the welding groove depending on the irradiation position of the laser beam, and sufficient welding properties cannot be guaranteed. In addition, there is a problem in that it is necessary to shift (offset) the irradiation position of the laser beam with respect to the welding groove, and so forth, which makes the positioning difficult.

The present invention has been conceived in light of the above-described circumstances, and an object thereof is to provide a welding equipment that performs welding of an annular body from inside thereof so as to be perpendicular to a welding groove, thereby making it possible to enhance weld quality.

Solution to Problem

In order to solve the above-described problems, the present invention employs the following solutions.

Specifically, an aspect of the present invention is a welding equipment in which a plurality of annular bodies having openings at both ends in an axial direction are placed one after another in the axial direction and that forms an annular joined body by joining the corresponding openings with each other by laser welding, the welding equipment including a vacuum compartment in which a vacuum atmosphere can be established; a holding member that is installed in the vacuum compartment and that holds the annular joined body in which a welding groove is formed by placing the openings of the plurality of the annular bodies next to each other; a window member that is installed in a wall of the vacuum compartment, which intersects with an axial center of the annular joined body, and that forms a portion of the wall; a laser radiating member that is installed outside the vacuum compartment and that radiates a laser beam into an internal space of the annular joined body through the window member; and a mirror member that is installed so as to be positioned in the internal space of the annular joined body and that adjusts a reflected laser beam, formed by reflecting the laser beam, so as to be oriented in a direction perpendicular to the welding groove.

With the welding equipment according to the aspect of the present invention, a plurality of annular bodies having openings at both ends in the axial direction are placed one after another in the axial direction and are mounted in the holding member in the vacuum compartment so as to form the annular joined body in which the welding groove is formed by placing the openings next the each other. Subsequently, vacuum suction is performed to establish a vacuum atmosphere in the vacuum compartment. The position of the reflected laser beam, which is reflected by the mirror member, in the axial direction is adjusted as needed in accordance with the position of the welding groove, and then, welding is initiated. Specifically, when the laser beam is radiated from the laser radiating member, the laser beam passes through the window member and is radiated on the mirror member that is installed so as to be positioned in the internal space of the annular joined body. This laser beam is reflected at the mirror member and is radiated in the direction perpendicular to the welding groove. The welding groove is melted by the radiated laser beam to complete joining. This welding may be penetration welding or non-penetration welding. In the case of non-penetration welding, welding is also performed from outside afterwards.

Because the annular joined body is welded from the inside thereof in this way, unexpected irregularities are not formed on the inside, which makes it possible to achieve a good interior state.

In addition, because the laser beam is radiated from the direction perpendicular to the welding groove, the position thereof can be easily set, and it is possible to reduce the risk of welding outside the welding groove. Therefore, because sufficient welding properties can be guaranteed, the weld quality can be enhanced.

Furthermore, because the laser radiating member is not installed in the vacuum compartment, the equipment configuration can be made compact, which makes it possible to make the equipment low-cost. Because the size of the vacuum area is small, the vacuum atmosphere can be established in a short period of time. Accordingly, the operation time can be reduced, which reduces the operating costs.

With the aspect of the present invention, it is preferable that at least one of the mirror member and the holding member be rotatable about the axial center.

By doing so, welding can be performed smoothly over the entire circumference of the annular joined body.

With the aspect of the present invention, it is preferable that a cooling member that cools the mirror member be provided.

When the laser beam is radiated on the mirror member in the vacuum atmosphere, the mirror member generates heat, which brings about the risk of, for example, deformation.

With the aspect of the present invention, because the mirror member is cooled by the cooling member, it can be cooled even if heat is generated therein. Accordingly, because it is possible to restrict deformation of the mirror member, the radiation position of the laser beam can be accurately set, and the weld quality can be enhanced.

With the aspect of the present invention, it is preferable that mirror member be installed so that a center of a reflecting surface thereof is shifted further from the axial center toward an opposite side from a radiating direction of the reflected laser beam.

When performing laser welding, metal vapor is generated at the welding portion, which spatters in all directions and adheres to the mirror member or the window member. If the metal vapor adheres to, for example, the mirror member, because the reflection level of the laser beam is reduced, there is a risk of incomplete welding.

With the aspect of the present invention, because the mirror member is installed so that the center of the reflecting surface thereof is shifted further from the axial center toward the opposite side from the radiation direction of the reflected laser beam, the distance between the portion to be welded and the mirror member can be increased as compared with a mirror member positioned at the axial center position of the annular joined body. Accordingly, it is possible to further restrict adhesion of the metal vapor on the mirror member, and therefore, the weld quality can be enhanced.

With the aspect of the present invention, it is preferable that gas supplying members be provided, which individually supply inert gas to vicinities of the reflecting surface of the mirror member and an inner surface of the window member.

When performing laser welding, metal vapor is generated at the welding portion, which spatters in all directions and adheres to the mirror member or the window member. If the metal vapor adheres to, for example, the mirror member, the reflection level of the laser beam is reduced. If the metal vapor adheres to the window portion, the transmission level of the laser beam is reduced. Because this reduces the laser beam intensities, there is a risk of incomplete welding.

With the aspect of the present invention, because the gas supplying members that individually supply the inert gas to the vicinities of the reflecting surface of the mirror member and the inner surface of the window member are installed, the pressure at respective positions in the vicinities of the reflecting surface of the mirror member and the inner surface of the window member is slightly increased when the inert gas is supplied thereto from the gas supplying members. When the pressure at the respective positions in the vicinities of the reflecting surface of the mirror member and the inner surface of the window member is increased, because the spattered metal vapor can be pushed back with the pressure, it is possible to restrict adhesion of the metal vapor on the reflecting surface of the mirror member and the inner surface of the window portion.

Therefore, because it is possible to restrict the reduction in the laser beam intensities, the weld quality can be enhanced.

Advantageous Effects of Invention

With the present invention, weld quality can be enhanced because the invention provides a vacuum compartment in which a vacuum atmosphere can be established; a holding member that is installed in the vacuum compartment and that holds an annular joined body in which a welding groove is formed by placing the openings of a plurality of annular bodies next to each other; a transparent window member that is installed in a wall of the vacuum compartment, which intersects with an axial center of the annular joined body, and that forms a portion of the wall; a laser radiating member that is installed outside the vacuum compartment and that radiates a laser beam into an internal space of the annular joined body through the window member; and a mirror member that is installed so as to be positioned in the internal space of the annular joined body and that adjusts a reflected laser beam, which is formed by reflecting the laser beam, so as to be oriented in a direction perpendicular to the welding groove.

DESCRIPTION OF EMBODIMENT

A welding equipment 1 according to an embodiment of the present invention will be described below with reference to FIGS. 1 to 4. The welding equipment 1 according to this embodiment forms end parts 5 for a superconducting accelerator cavity 3.

Figure 1:
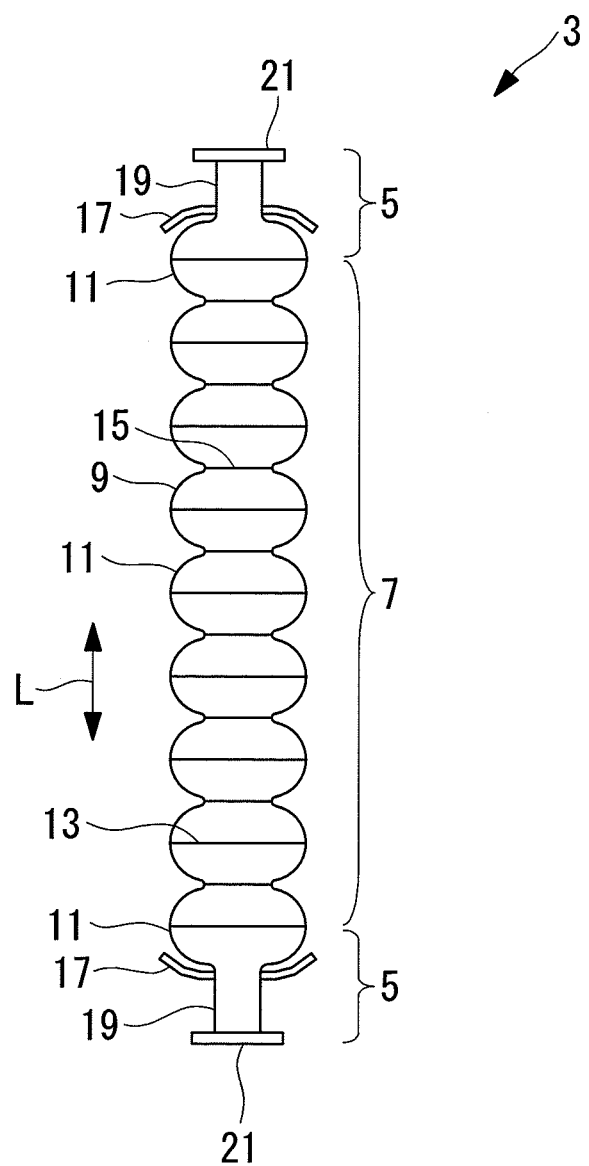
FIG. 1 is a front view of a superconducting accelerator cavity to which end parts are attached by welding by employing a welding equipment according to an embodiment of the present invention.
Figure 2:
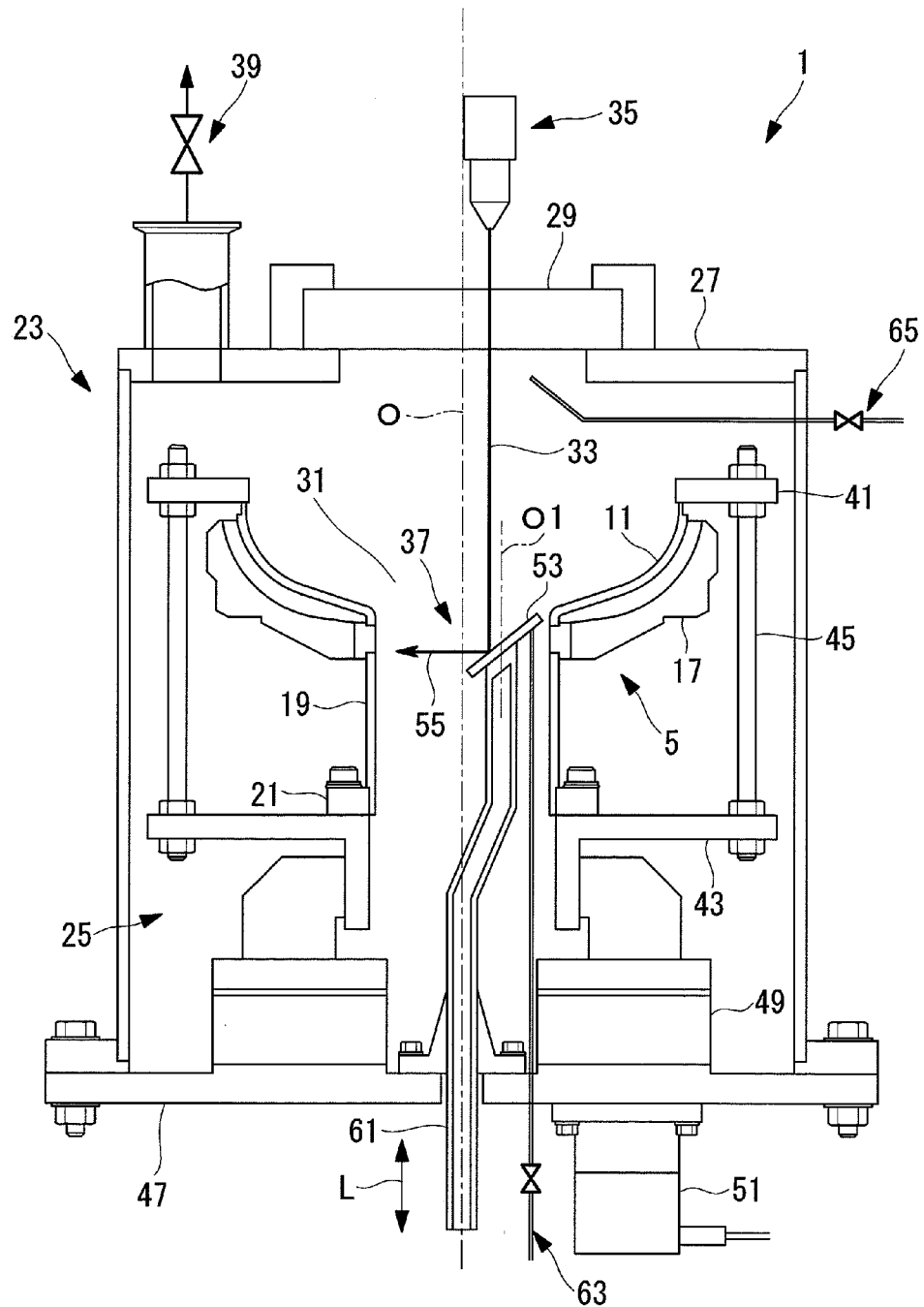
FIG. 2 is a cross-sectional view showing, in outline, the configuration of the welding equipment according to the embodiment of the present invention.
Figure 3:
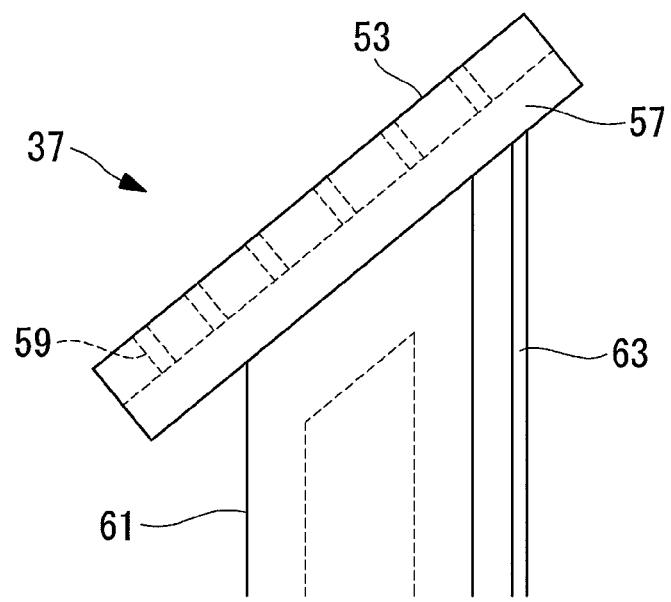
FIG. 3 is a partial front view showing a mirror according to the embodiment of the present invention.

FIG. 1 is a front view of the superconducting accelerator cavity 3 to which the end parts 5 fabricated with the welding equipment 1 according to the embodiment of the present invention are attached. FIG. 2 is a cross-sectional view showing, in outline, the configuration of the welding equipment 1 according to the embodiment of the present invention. FIG. 3 is a partial front view showing a mirror according to the embodiment of the present invention.

As shown in FIG. 1, the superconducting accelerator cavity 3 is provided with the end parts (annular joined bodies) 5 and a cavity portion 7.

The cavity portion 7 is a structure in which cells 9 with circular tube shapes having swollen center portions are combined. For the superconducting accelerator cavity 3, for example, niobium-based materials, which are superconducting materials, are subjected to bending and press forming, thus forming half cells 11, which are the cells 9 divided into two in the axial direction thereof. The half cells 11 extend along an axial direction L between equator portions 13, which are the most-swollen portions of the cells 9, and iris portions 15, which are the narrowest portions thereof.

The cavity portion 7 is formed by joining a plurality of half cells 11 by welding so that the equator portions 13 thereof are overlaid on each other or the iris portions 11 thereof are overlaid on each other. The equator portions 13 of the half cells 11 are individually positioned at both ends of the cavity portion 7.

The end parts 5 are formed of the half cells (annular bodies) 11, end plates (annular bodies) 17, and beam pipes (annular bodies) 19.

The end plates 17 form both ends of a helium jacket into which liquid helium is introduced and are made of, for example, titanium. The beam pipes 19 are hollow, circular tube members made of, for example, niobium, and are provided with flanges 21 at one end thereof.

Groove portions with which the iris portions 15 of the half cells 11 engage are provided over the entire circumference at one end of the end plates 17 in the axial direction L, and groove portions with which ends of the beam pipes 19 engage are provided at the other end thereof.

Figure 4:
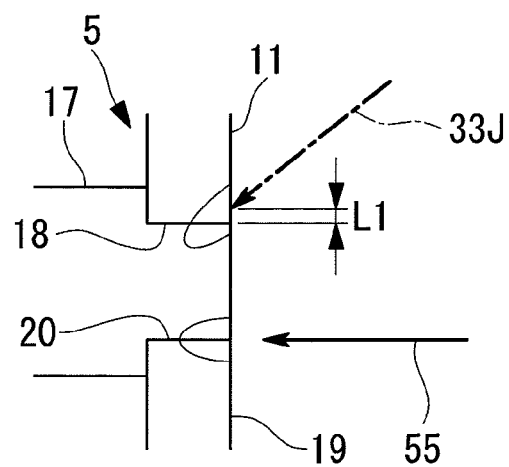
FIG. 4 is a partial cross-sectional view showing welded states achieved by the welding equipment according to the embodiment of the present invention.

The end parts 5 are formed by engaging the iris portions 15 of the half cells 11 and the ends of the beam pipes 19 with the groove portions of the end plates 17, thereby forming welding grooves 18 and 20 that extend in a substantially horizontal direction, as shown in FIG. 4, and by joining these welding grooves 18 and 20 by welding.

The superconducting accelerator cavity 3 is formed by joining, by welding, the equator portions 13 of the half cells 11 positioned at both ends of the cavity portion 7 to the equator portions 13 of the half cells 11 positioned at one end of the end parts 5.

As shown in FIG. 2, the welding equipment 1 is provided with a hollow vacuum chamber (vacuum compartment) 23 with a circular tube shape; a holding member 25 that is installed inside the vacuum chamber 23 and holds the end part 5 so that an axial center O thereof extends in the vertical direction; a window (window member) 29 provided at a top-end surface portion (wall) 27 of the vacuum chamber 23, with which the axial center O intersects; a laser radiating head (laser radiating member) 35 that is installed outside the vacuum chamber 23 and radiates a laser beam 33 into an internal space 31 of the end part 5 through the window 29; and a mirror member 37 that is installed inside the internal space 31 and reflects the laser beam 33.

A vacuum suction member 39 that sucks gas in the vacuum chamber 23 to establish a vacuum atmosphere in the vacuum chamber 23 is connected to the vacuum chamber 23.

The holding member 25 is provided with a top holding plate 41 and a bottom holding plate 43 that firmly hold the end part 5 at both ends thereof; a plurality of restraining shafts 45 that link between the top holding plate 41 and the bottom holding plate 43 to maintain the distance therebetween; and a positioner 49 whose bottom portion is fixedly attached to a bottom-end surface portion 47 of the vacuum chamber 23 and whose a top portion is rotatable about the axial center O.

A bottom portion of the bottom holding plate 43 is fixedly attached to the top portion of the positioner 49.

The window 29 is attached so as to cover an opening in the top-end surface portion 27 and forms a sealed structure by being integrated with the top-end surface portion 27.

A motor 51 provided with a speed-reduction gear, which rotates the top portion of the positioner 49, is provided at a bottom portion of the bottom-end surface portion 47.

The laser radiating head 35 is mounted so as to be movable in a horizontal plane. By being moved in the horizontal plane, the laser radiating head 35 can adjust, in the horizontal plane, the position of the laser beam 33 radiated therefrom.

A top surface (reflecting surface) 53 of the mirror member 37 reflects the laser beam 33, thus turning it into a reflected laser beam 55. A space 57 is provided at a bottom portion of the mirror member. The space 57 and the top surface 53 are communicated with each other via a plurality of through-holes 59. The through-holes 59 are provided at the circumferential edge of the top surface 53 at positions that are not irradiated with the laser beam 33.

A cooling pipe (cooling member) 61 that extends in the vertical direction and that has an internal space through which a cooling liquid passes is fixedly attached to the bottom-end surface portion 47. The top end of the cooling pipe 61 is closed and is also inclined. Because the bottom surface of the mirror member 37 is attached to the top end of the cooling pipe 61, it is inclined along the inclination at the top end thereof.

The cooling pipe 61 is bent so that an axial center O1 at the top end thereof does not align with an axial center O. The mirror member 37 is mounted so that the axial center O1 passes through the center of the plane of the top surface 53, and the side closer to the axial center O is positioned at the lower side thereof.

By doing so, the mirror member 37 is installed such that the top-surface center (axial center O1) thereof is shifted further from the axial center O toward the opposite side from the radiation direction of the reflected laser beam 55.

A gas pipe (gas supplying member) 63 that supplies inert gas, for example, argon gas, to the space 57 from outside the vacuum chamber 23 is connected to the bottom surface of the mirror member 37.

A gas pipe (gas supplying member) 65 that supplies inert gas, for example, argon gas, from outside the vacuum chamber 23 is connected to the vicinity of an inner surface of the window 29.

The operation of the welding equipment 1 according to this embodiment having the above-described configuration will now be described.

First, the half cell 11 and the beam pipe 19 are individually engaged with the groove portions processed at both ends of the end plate 17 in the axial direction L, and they are held in the holding portion 25 in a state in which the half cell 11, the end plate 17, and the beam pipe 19 are placed one after another in the axial direction L.

Next, the vacuum suction member 39 is activated to suck out gas in the vacuum chamber 23, thus establishing a vacuum atmosphere in the vacuum chamber 23.

The position of the laser radiating head 35 in the horizontal direction is adjusted so that the position of the reflected laser beam 55 in the axial direction L is aligned with the welding groove 20.

Cooling liquid is supplied to the cooling pipe 61. Inert gas is supplied to the space 57 with the gas pipe 63 so that the inert gas exits from the top surface 53 via the through-holes 59. Inert gas is supplied to the vicinity of the inner surface of the window 29 with the gas pipe 65.

When the laser beam 33 is emitted from the laser radiating head 35 in this state, the laser beam 33 strikes the top surface 53 of the mirror member 37 and is reflected, becoming the reflected laser beam 55 that travels in the substantially horizontal direction. This reflected laser beam 55 is radiated on the welding groove 20 and melts the welding groove 20 to complete joining.

By rotating the top portion of the positioner 49 about the axial center O by activating the motor 51, the welding groove 20 can be welded over the entire circumference.

Although this embodiment is configured so that the end part 5 rotates about the axial center O, the configuration may be such that the end part 5 is fixed and the laser radiating head 35 and the mirror member 37 are rotated about the axial center O. In addition, the end part 5, the laser radiating head 35, and the mirror member 37 may be individually rotated about the axial center O.

When welding of the welding groove 20 is completed, the position of the laser radiating head 35 in the horizontal direction is adjusted so that the position of the reflected laser beam 55 in the axial direction L aligns with the welding groove 18, and the welding groove 18 is welded as with the welding groove 20.

Although this embodiment is configured such that the position of the reflected laser beam 55 in the axial direction L is adjusted by adjusting the position of the laser radiating head 35 in the horizontal direction, the configuration may be such that the position of the mirror member 37 in the axial direction L is adjusted without changing the horizontal position of the laser radiating head 35.

At this time, because the laser beam 33 is radiated on the mirror member 37 placed in a vacuum atmosphere, the mirror member 37 generates heat, which brings about the risk of, for example, deformation. Because the mirror member 37 in this embodiment is cooled with the cooling liquid supplied by the cooling pipe 61, it can be cooled even if heat is generated therein. Accordingly, because it is possible to restrict, for example, deformation of the mirror member 37, the radiating position of the reflected laser beam 55 can be accurately set, and the weld quality can be enhanced.

In addition, although metal vapor generated at welding portions spatters therefrom, because the inert gas is supplied to the vicinities of the top surface 53 of the mirror member 37 and the inner surface of the window 29 in this embodiment, the pressure at respective positions in the vicinities of the top surface 53 of the mirror member 37 and the inner surface of the window 29 is slightly increased. When the pressure at the respective positions in the vicinities of the top surface 53 of the mirror member 37 and the inner surface of the window 29 is increased, because the spattered metal vapor can be pushed back with the pressure, it is possible to restrict adhesion of the metal vapor on the top surface 53 of the mirror member 37 and the inner surface of the window 29.

Therefore, because it is possible to restrict reductions in the intensities of the laser beam 33 and the reflected laser beam 55, the weld quality can be enhanced.

As has been conventionally done, if a laser beam 33J is directly radiated toward the welding groove 18, for example, as shown by the one-dot chain line in FIG. 4, because the end part 5 extends above the welding groove 18, the laser beam 33J is inevitably incident at an angle with respect to the direction in which the welding groove 18 extends. Accordingly, because the welding groove 18 and the melting area of the laser beam 33J are in an intersecting relationship, there is a risk of a melted portion being outside the welding groove 18 depending on the radiation position of the laser beam 33, and thus, sufficient welding properties cannot be guaranteed. In addition, this makes it necessary to shift (offset) the radiation position of the laser beam 33 by a distance L1 with respect to the welding groove 18, and so forth, which makes positioning difficult.

In contrast, in this embodiment, because the reflected laser beam 55 is aligned with the direction in which the welding groove 20 extends, in other words, because it is radiated in the direction perpendicular to the welding groove 20, it is possible to easily set the position thereof, and it is also possible to reduce the risk of the melted portion being outside the welding groove 20. Therefore, because sufficient welding properties can be guaranteed, the weld quality can be enhanced.

In addition, because welding is performed from inside the end part 5, unexpected irregularities are not formed at the inside thereof, which makes it possible to achieve a good interior state.

Furthermore, because the laser radiating head 35 is installed outside the vacuum chamber 23, the equipment configuration of the vacuum chamber 23 can be made compact, and it is possible to make the equipment low-cost. If the vacuum chamber 23 can be made compact, a vacuum atmosphere can be established in a short period of time, and therefore, the operation time for the welding can be reduced, which makes it possible to reduce the operating costs.

The present invention is not limited to the above-described embodiment, and various modifications are possible within a range that does not depart form the spirit of the present invention.

REFERENCE SIGNS LIST

1 welding equipment
5 end part
11 half cell
17 end plate
18 welding groove
19 beam pipe
20 welding groove
23 vacuum chamber
25 holding member
29 window
33 laser beam
35 laser radiating head
53 top surface
55 reflected laser beam
61 cooling pipe
63 gas pipe
65 gas pipe
L axial direction
O, O1 axial center

The invention claimed is:

1. A welding equipment in which a plurality of annular bodies having openings at both ends in an axial direction are placed one after another in the axial direction and that forms an annular joined body by joining the corresponding openings with each other by laser welding, the welding equipment comprising:
   a vacuum compartment in which a vacuum atmosphere can be established;
   a holding member that is installed in the vacuum compartment and that holds the annular joined body in which a welding groove is formed by placing the openings of the plurality of the annular bodies next to each other;
   a window member that is installed in a wall of the vacuum compartment, which intersects with an axial center of the annular joined body, and that forms a portion of the wall;
   a laser radiating member that is installed outside the vacuum compartment and that radiates a laser beam into an internal space of the annular joined body through the window member; and
   a mirror member that is installed so as to be positioned in the internal space of the annular joined body and that adjusts a reflected laser beam, formed by reflecting the laser beam, so as to be oriented in a direction perpendicular to the welding groove.

2. The welding equipment according to claim 1, wherein at least one of the mirror member and the holding member can be rotated about the axial center.

3. The welding equipment according to claim 1, further comprising a cooling member that cools the mirror member.

4. The welding equipment according to claim 1, wherein the mirror member is installed so that a center of a reflecting surface thereof is shifted further from the axial center toward an opposite side from a radiating direction of the reflected laser beam.

5. The welding equipment according to claim 1, further comprising gas supplying members that individually supply inert gas to vicinities of the reflecting surface of the mirror member and an inner surface of the window member.

\* \* \* \* \*